(12) United States Patent
Cherukuri et al.

(10) Patent No.: US 12,480,992 B2
(45) Date of Patent: Nov. 25, 2025

(54) TECHNIQUES FOR IDENTIFICATION AND CORRECTION OF CLOCK DUTY-CYCLE

(71) Applicant: Intel Corporation, Santa Clara, CA (US)

(72) Inventors: John R. Cherukuri, Austin, TX (US); Roan M. Nicholson, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 915 days.

(21) Appl. No.: 17/485,117

(22) Filed: Sep. 24, 2021

(65) Prior Publication Data

US 2023/0108736 A1 Apr. 6, 2023

(51) Int. Cl.
*G06F 1/00* (2006.01)
*G01R 19/165* (2006.01)
*G01R 31/317* (2006.01)

(52) U.S. Cl.
CPC . *G01R 31/31727* (2013.01); *G01R 19/16576* (2013.01)

(58) Field of Classification Search
CPC ........ G01R 31/31727; G01R 19/16576; G01R 19/165; G01R 29/0273
See application file for complete search history.

(56) References Cited

U.S. PATENT DOCUMENTS

| | | | |
|---|---|---|---|
| 7,595,675 B2 * | 9/2009 | Boerstler | G01R 31/31727 327/175 |
| 9,030,244 B1 * | 5/2015 | Luo | H03K 3/017 327/175 |
| 9,148,135 B2 * | 9/2015 | Li | H03K 5/1565 |
| 10,270,429 B1 * | 4/2019 | Wang | G06F 1/10 |
| 10,622,982 B1 * | 4/2020 | Naidorf | H03K 7/06 |
| 10,775,431 B2 * | 9/2020 | Miwa | G01R 25/005 |
| 2022/0103166 A1 * | 3/2022 | Balasubramanian | G06F 1/08 |

* cited by examiner

*Primary Examiner* — Xuxing Chen
(74) *Attorney, Agent, or Firm* — Schwabe, Williamson & Wyatt, P.C.

(57) ABSTRACT

Embodiments herein relate to an apparatus comprising: a first circuit with a plurality of stages; and a second circuit communicatively coupled with the first circuit, wherein the second circuit includes: a plurality of tap lines, wherein respective tap lines of the plurality of tap lines are coupled between two stages of the plurality of stages; and the logic, wherein the logic is to identify, based on an average voltage measurement of at least one tap line, a status of a duty-cycle of a signal propagating through a stage of the first circuit. Other embodiments may be described and claimed.

19 Claims, 5 Drawing Sheets

TECHNIQUES FOR IDENTIFICATION AND CORRECTION OF CLOCK DUTY-CYCLE

FIELD

The present application generally relates to the field of electronic circuits and, more specifically, to observation, isolation, and correction (identification and correction) of clock duty-cycles and associated apparatuses, systems, and methods.

BACKGROUND

High-speed serial input/outputs (I/Os) are scaling in frequency. For instance, phase locked loops (PLLs) are currently running at 8 gigahertz (Ghz), and future iterations may be running at 16 Ghz, 32 Ghz, or higher. Duty-cycle issues may arise as frequency increases.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

As previously noted, high-speed serial I/Os are scaling in frequency. For instance, future iterations of PLLs may be running at 16 Ghz, 32 Ghz, or higher. Duty-cycle issues may arise as frequency increases. Previous techniques to analyze or resolve duty-cycle issues may have included the use of laser-based silicon probe tools to isolate the clock-stage that contributed to duty-cycle issues. However, the use of such tools may have required a timespan of several weeks to accurately identify and resolve duty-cycle issues. Additionally, some of these probing tools are reaching end-of-life, and may not be available to probe frequencies higher than 8 Ghz. Additionally, infrared-based laser probing tools may not be usable in future generations of circuits, as the diffusion layers of such circuits may not be accessible.

Embodiments herein relate to a duty-cycle analysis circuit that may resolve one or more of the above-described issues of legacy analysis circuits. Specifically, embodiments herein relate to an analysis circuit that may be coupled with a high-speed serial I/O clock circuit by a plurality of tap lines. By measuring the voltage of the clock circuit at various ones of the tap lines, a duty-cycle status may be identified, which may indicate how long the circuit is spending at signal-level. This status may be used to identify whether adjustments to the duty-cycle are necessary. Additionally, by identifying which tap line was used for the voltage measurement, it may be possible to identify which stage of the multi-stage clock circuit is creating issues with respect to the duty-cycle.

Embodiments can provide a plurality of advantages. For example, through use of the duty-cycle analysis circuit, it may not be necessary to picoprobe high-frequency signals to isolate duty-cycle issues on high-speed serial I/Os (which may become difficult to perform due to hardware limitations related to the picoprobe as previously noted). Additionally, it may not be necessary to rely on laser probe tools to isolate on-die duty-cycle issues. Finally, the use of the duty-cycle analysis circuit may allow for the detection and correction of devices in a high-frequency LC-tank based PLL (LCPLL) and/or some other high-frequency clock distribution network that is contributing to duty-cycle issues.

Figure 1:
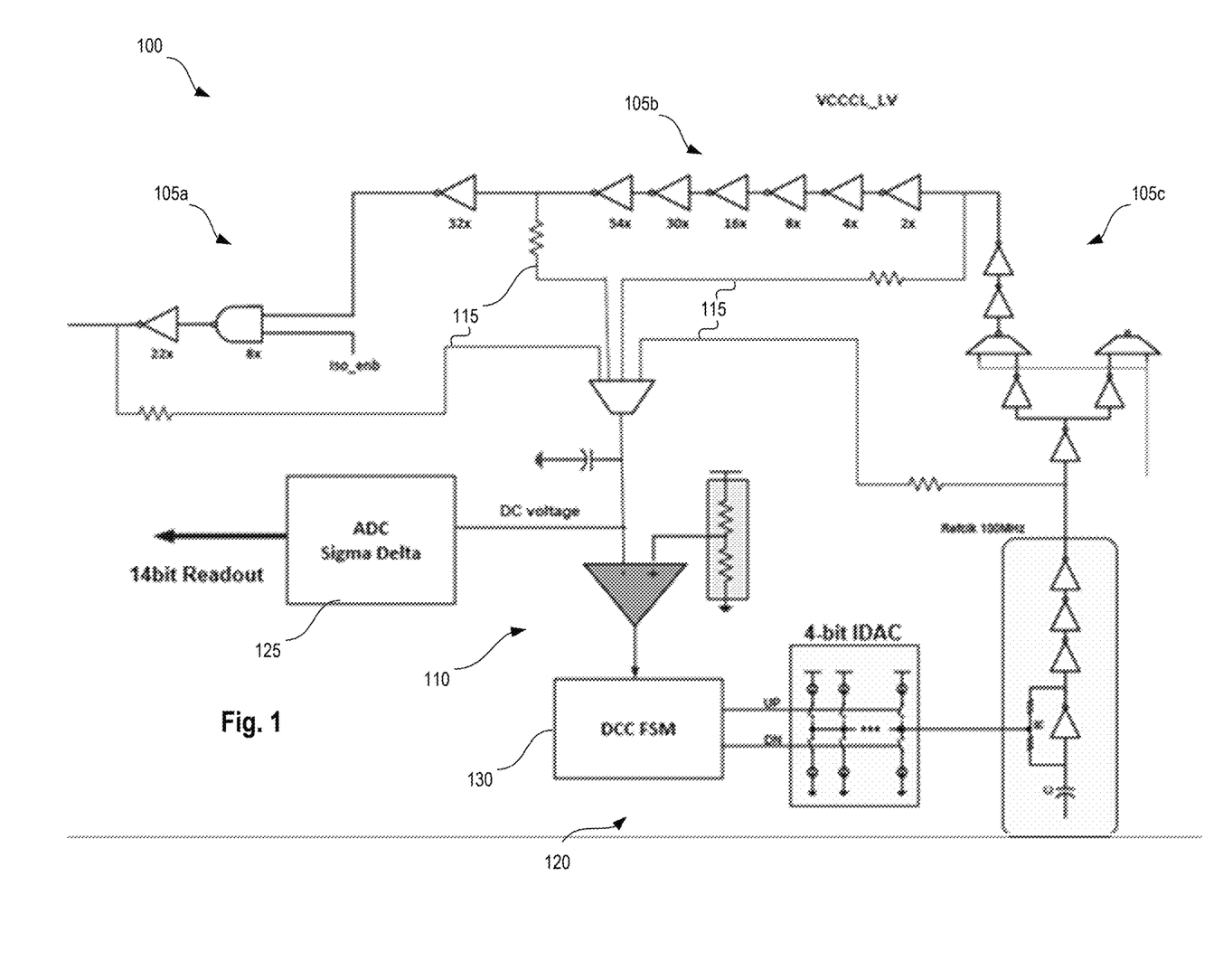
FIG. 1 illustrates an example of a high-speed serial I/O clock distributed network circuit coupled with a duty-cycle analysis circuit, in accordance with various embodiments.

FIG. 1 illustrates an example of a high-speed serial I/O clock distributed network circuit 100 coupled with a duty-cycle analysis circuit 110, in accordance with various embodiments. As may be seen in FIG. 1, the circuit 100 may include a number of stages 105a, 105b, and 105c. It will be noted that although only three stages are depicted in FIG. 1, in other embodiments the circuit 100 may include more or fewer stages.

The duty-cycle analysis circuit 110 may include a number of tap lines 115 that are communicatively coupled with the circuit 100 at various points of the circuit 100. For example, FIG. 1 depicts a duty-cycle analysis circuit 110 with four tap lines 115 that are respectively coupled to the circuit 100 between the stages 105a/105b/105c of the circuit 100. As may be seen in FIG. 1, respective ones of the tap lines 115 may include a resistor isolation, which may isolate the circuit 100 from degradation produced by the duty-cycle analysis circuit 110 that may otherwise alter the function of one or more stages 105a/105b/105c of the circuit 100.

The duty-cycle analysis circuit 110 may further include logic 125, which may be configured to identify a voltage measurement at a point where at least one of the tap lines 115 is coupled with the circuit 100, and based on the measurement, identify a status of the duty-cycle of the circuit 100 as explained in greater detail below.

The duty-cycle analysis circuit 110 may further include a feedback loop portion 120 that is coupled with the circuit 100. The feedback loop portion 120 may be used to alter a characteristic of the duty-cycle of the circuit 100 to correct for one or more identified duty-cycle issues. The feedback loop portion 120 may include logic 130 configured to alter one or more of a voltage, phase, or current of an electrical signal propagating through the circuit 100, or through a particular stage 105a/105b/105c of the circuit 100.

Figure 2:
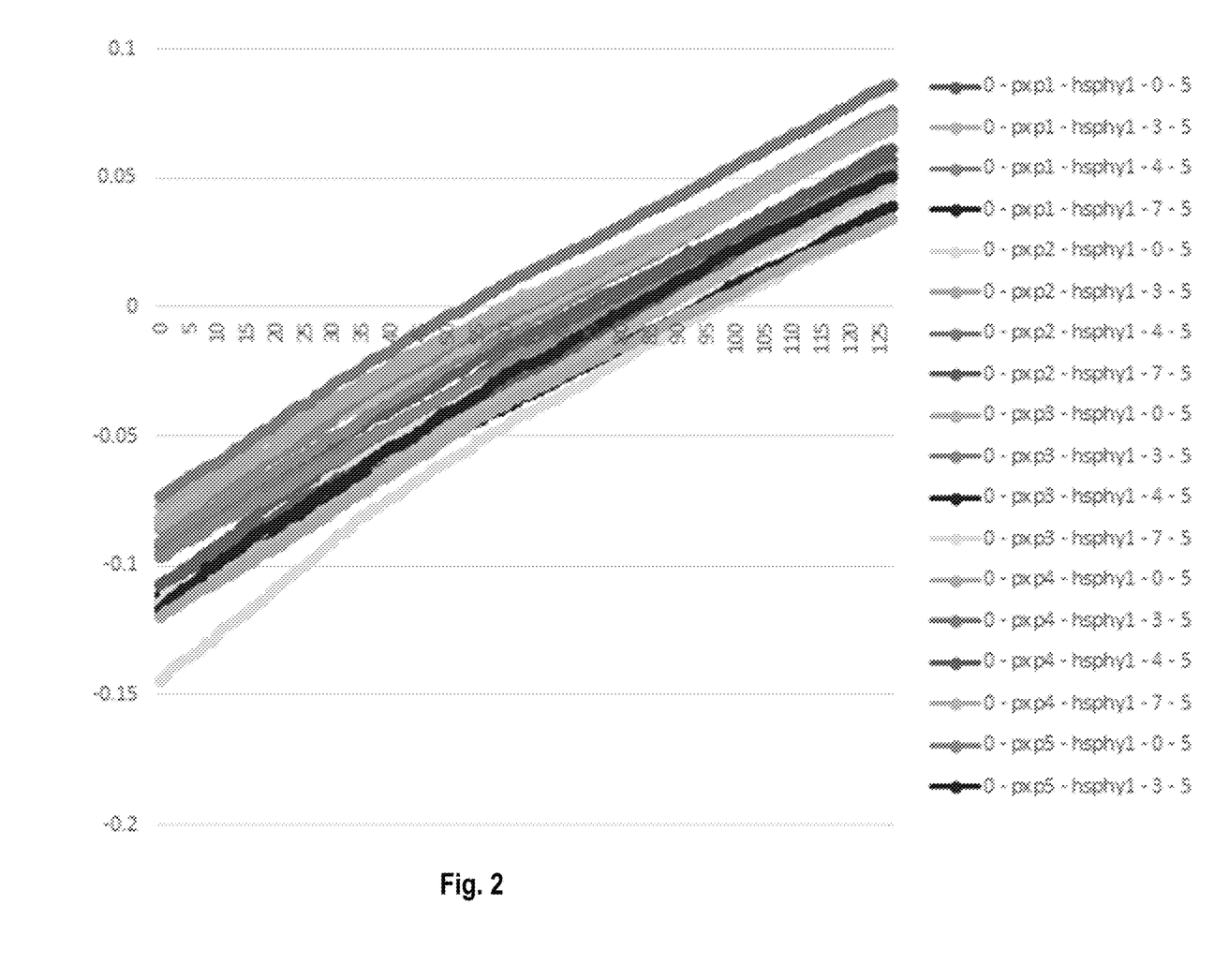
FIG. 2 illustrates an example of results of duty-cycle analysis, in accordance with various embodiments.

FIG. 2 illustrates an example of results of duty-cycle analysis, in accordance with various embodiments. Specifically, in FIG. 2, the X-axis represents the code that was changing the duty-cycle of a stage of an example of the LCPLL clock network. The Y-axis represents the direct current (DC) voltage after filtering the clock, for example, by logic such as logic 125.

Specifically, the logic 125 may measure the average voltage of a circuit such as circuit 100 at one or more points at which a tap line such as tap line 115 is coupled with the circuit. Based on the average voltage, the logic 125 may be configured to identify a status of the duty-cycle, which is represented in the graph of FIG. 2. If the measured average voltage is greater than half of the signal-level of the circuit (which may be represented as Vcc/2), then the logic 125 may identify that the duty-cycle is spending more time at signal-level (e.g., Vcc) than off-level (e.g., ground or some other voltage that is used to represent a signal value of "0"). In such a case, the value of the measurement in the graph of FIG. 2 may be greater than the "0"-line. Alternatively, if the measured average voltage is less than half of the signal-level of the circuit, then the logic 125 may identify that the duty-cycle is spending less time at signal-level than off-level. In such a case, the value of the measurement in the graph of FIG. 2 may be less than the "0"-line.

The graph shows data from various measurements of different circuits at different points, which all exhibit the desired behavior. Generally, the point where a curve meets the "0"-line of the X-axis may be interpreted as the point where the duty-cycle is 50/50. In other words, the "0"-line of the X-axis may be interpreted as the point where the duty-cycle is spending approximately 50% of the time at signal-level and 50% of the time at ground.

Figure 3:
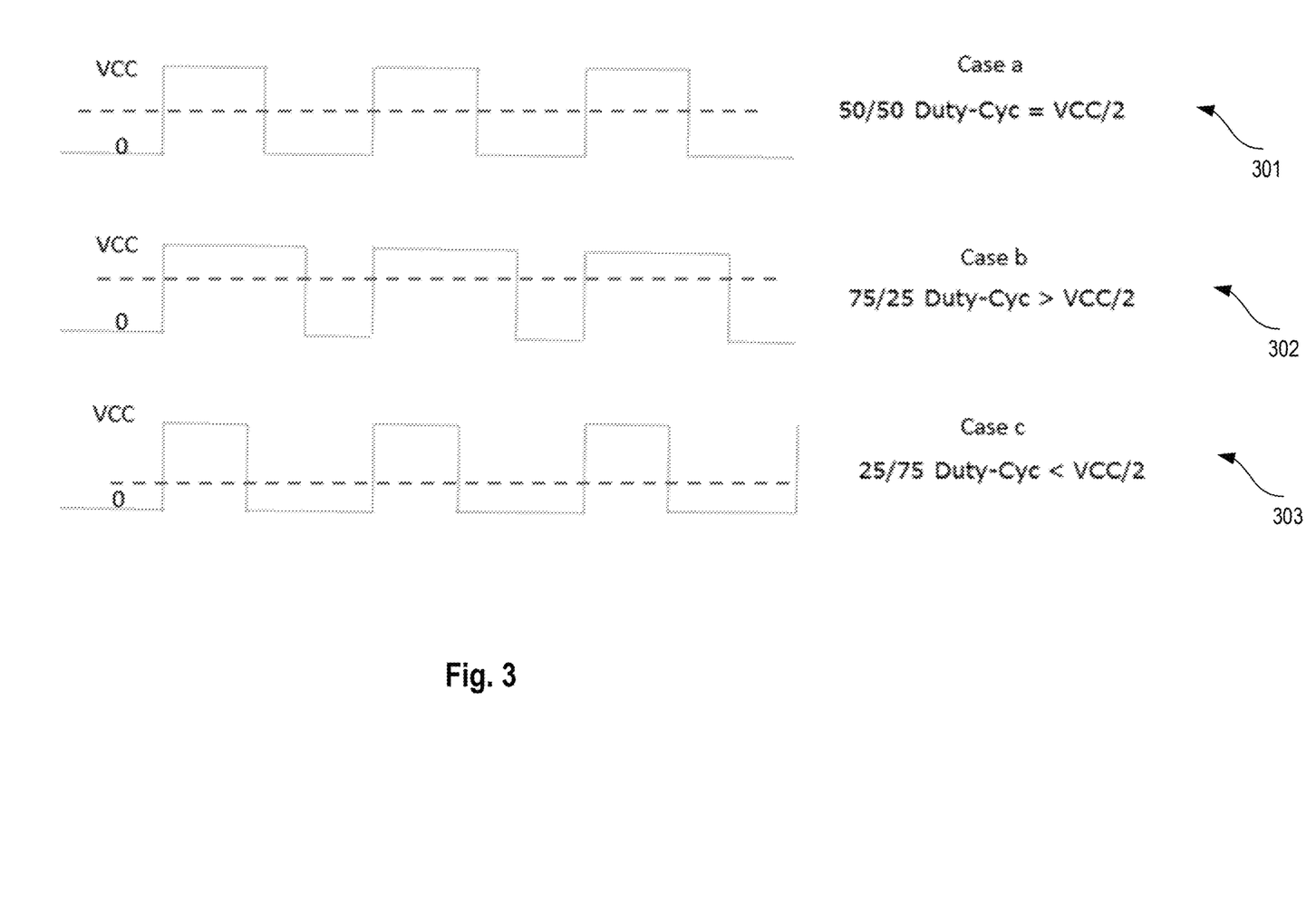
FIG. 3 illustrates an example of duty-cycle measurement, in accordance with various embodiments.

FIG. 3 illustrates an example of duty-cycle measurement, in accordance with various embodiments. Specifically, FIG. 3 depicts measurement of duty-cycle as a function of measured DC voltage. For the sake of FIG. 3, assume that the signal transitions from off-level (e.g., ground or 0V, although in other embodiments the off-level may be higher or lower) to signal-level (e.g., Vcc).

In the ideal case when there is no duty-cycle distortion, for example, as shown at 301, then the average DC voltage measured will be approximately Vcc/2 since the signal may be in high-phase (e.g., signal-level) roughly the same amount of time as it is in low-phase (e.g., off-level).

In the second case, as illustrated at 302, when high-phase is 75% and low-phase is 25%, then the measured average DC voltage may be greater than Vcc/2. Similarly, in the third case, as illustrated at 303, when high-phase is 25% and low-phase is 75%, then the measured average DC voltage may be less than Vcc/2.

As can be seen above, Vcc/2 may be considered a threshold voltage for identification of whether the duty-cycle is biased towards signal-level or off-level. More specifically, the second case 302 may be considered to be biased towards signal-level. By contrast, the third case 303 may be considered to be biased towards off-level.

Based on this technique, by measuring the average voltage of a circuit such as circuit 100, logic 125 may be able to identify the status of the duty-cycle (e.g., how much time the circuit is spending at signal-level or off-level). Additionally, as noted above, if one or both of logic 125 or logic 130 identify that an adjustment to the duty-cycle is necessary, then logic 130 may be configured to alter one or more of the phase, voltage, or current to the circuit 100 or a stage of the circuit to adjust the duty-cycle.

This technique may be considered a simple method of extrapolating duty-cycle from DC measurements, and may be especially useful in checking duty-cycle across various stages of a clock network such as circuit 100 as described above. Additionally, this technique may be useful in situations where it is desirable to isolate the source of duty-cycle distortion in a circuit and eliminate the need for test hardware.

Figure 4:
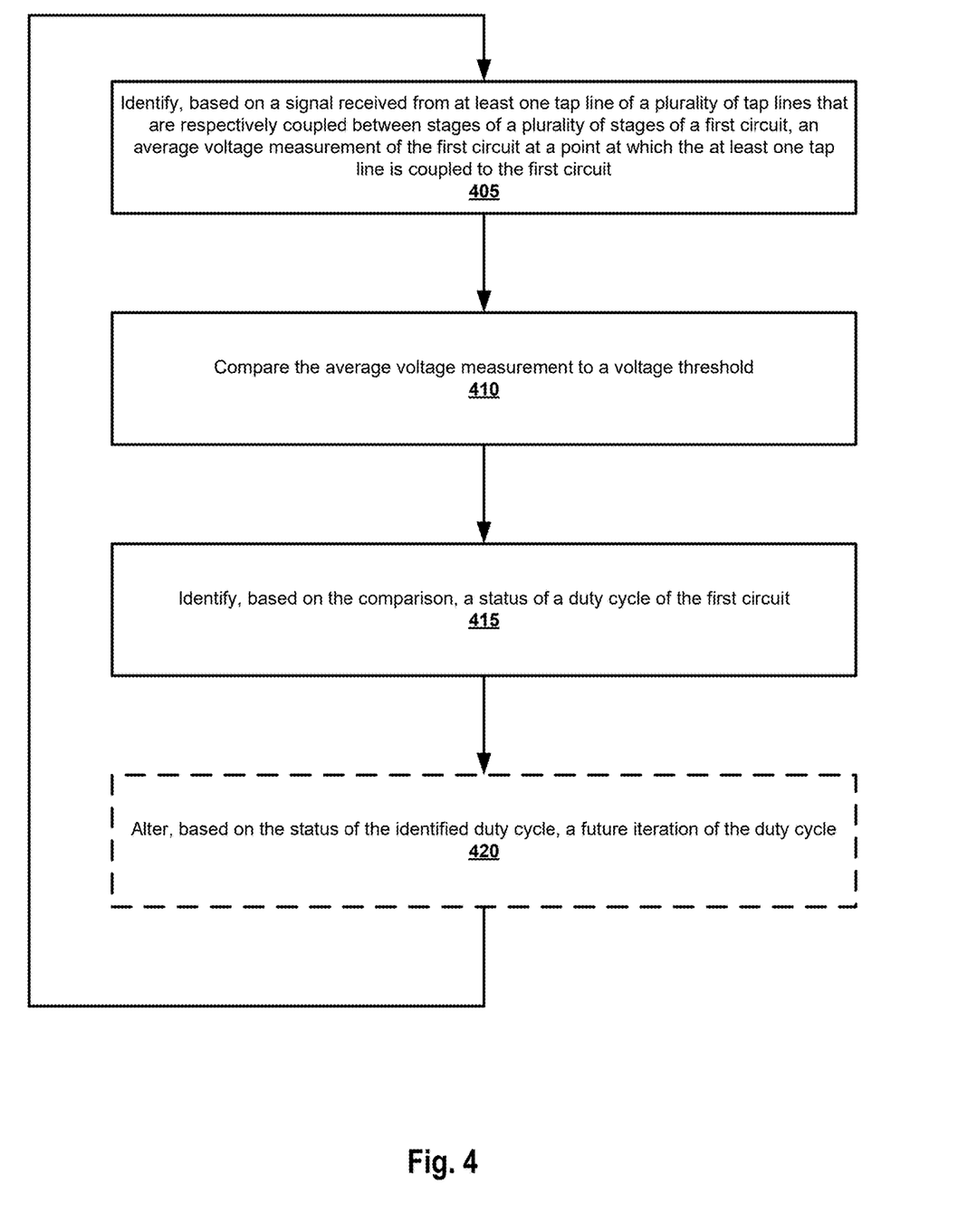
FIG. 4 illustrates an example technique related to duty-cycle analysis, in accordance with various embodiments.

FIG. 4 illustrates an example technique related to duty-cycle analysis, in accordance with various embodiments. While the blocks are illustrated in a particular sequence, the sequence can be modified. For example, some blocks can be performed before others, while some blocks can be performed simultaneously with other blocks. In general, the technique may be performed by logic such as logic 125, while in other embodiments the technique may be performed by additional or alternative logic.

The technique may include identifying, at 405 based on a signal received from at least one tap line of a plurality of tap lines that are respectively coupled between stages of a plurality of stages of a first circuit, an average voltage measurement of the first circuit at a point at which at least one tap line is coupled to the first circuit. The first circuit may be similar to, for example, circuit 100, and the tap line may be similar to tap lines 115. The average voltage may be identified based on periodic measurements at distinct points in time, a continuous measurement, or some other type of measurement. It will also be understood that even though embodiments herein describe an average voltage, other embodiments may be based on a mean voltage, a median voltage, a singular voltage measurement, or some other type of measurement.

The technique may further include comparing, at 410, the average voltage measurement to a voltage threshold such as the voltage threshold of Vcc/2 as described above, or some other voltage threshold.

The technique may further include identifying, at 415 based on the comparison, a status of a duty-cycle of the first circuit. As noted above, the status may be whether the duty-cycle is biased towards signal-level or off-level. In some embodiments, the status may be related to the duty-cycle for the entire circuit, or a duty-cycle for only a stage or subset of stages of the circuit.

The technique may optionally further include altering, at 420 based on the status of the identified duty-cycle, a future iteration of the duty-cycle. For example, if the duty-cycle is biased towards signal-level, then the duty-cycle may be incrementally altered to be biased towards off-level (e.g., ground). Conversely, if the duty-cycle is biased towards off-level, then the duty-cycle may be incrementally altered to be biased towards signal-level. In some cases, if no alteration is required (e.g., the duty-cycle is biased correctly), then no alteration may be performed. As previously described, the alteration may be or include an alteration of at least one of voltage, current, or phase of a signal supplied to the first circuit. The technique may then repeat as shown in FIG. 4 so that the duty-cycle can be repeatedly and incrementally monitored and/or adjusted.

The flowchart of FIG. 4 can be performed partially or wholly by software provided in a machine-readable storage medium (e.g., memory). The software is stored as computer-executable instructions (e.g., instructions to implement any other processes discussed herein). Program software code/instructions associated with the flowchart (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowchart (and/or various embodiments) are executed by the processor system.

In some embodiments, the program software code/instructions associated with the flowchart (and/or various embodiments) are stored in a computer executable storage medium and executed by the processor. Here, the computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including, for example, ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with the flowchart and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines, or other sequences of instructions or organization of sequences of instructions, by way of example. Thus, it is not required that the data and instructions be on a tangible machine-readable medium in entirety at a particular instance of time.

Examples of the tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD-ROMs), Digital Versatile Disks (DVDs), etc.), among others. The software program code/instructions may be temporarily stored in digital tangible communication links while implementing electrical, optical, acoustical, or other forms of propagating signals, such as carrier waves, infrared signals, digital signals, etc. through such tangible communication links.

In general, tangible machine-readable medium includes any tangible mechanism that provides (e.g., stores and/or transmits in digital form, e.g., data packets) information in a form accessible by a machine (e.g., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, a processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 5:
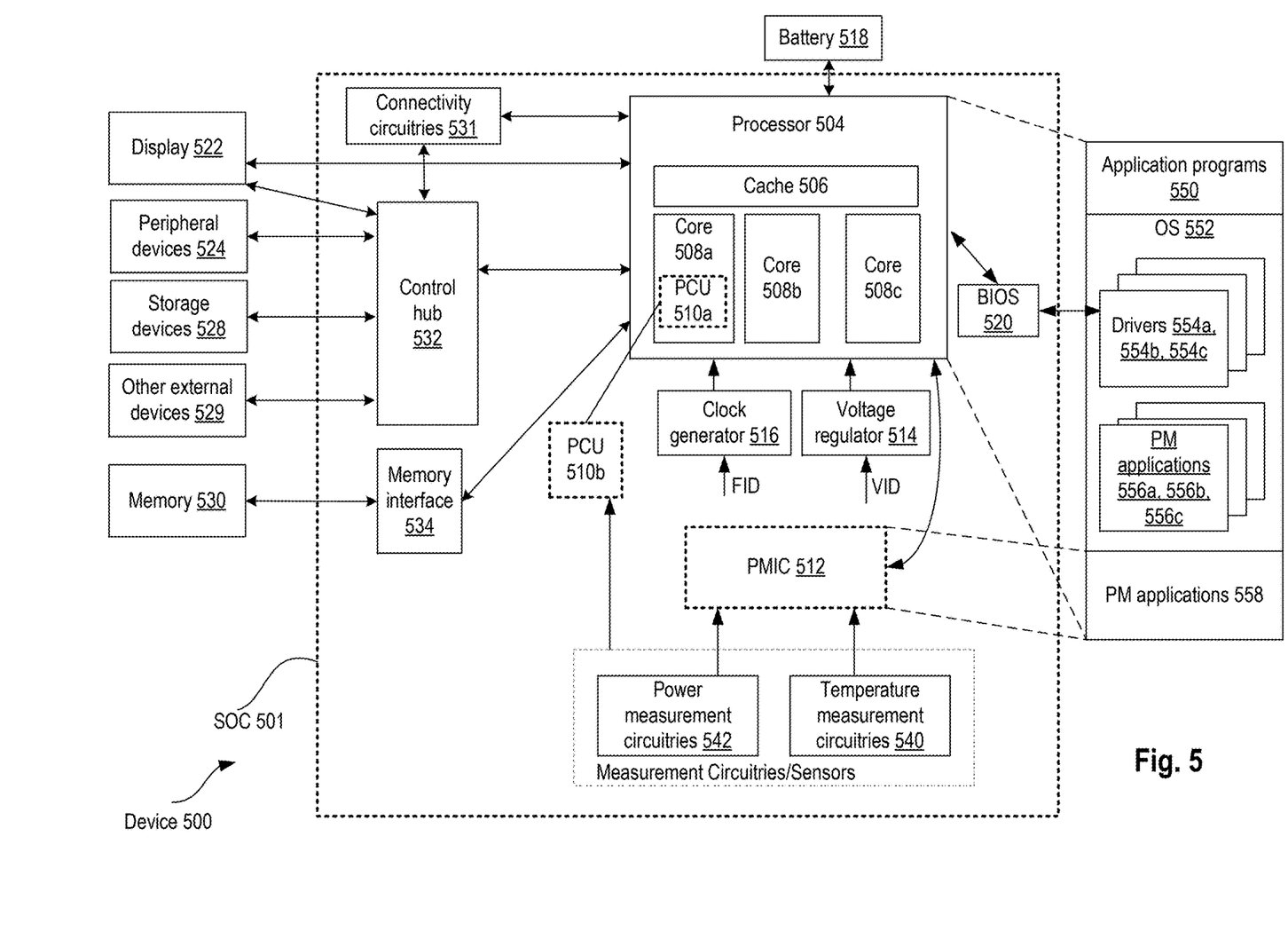
FIG. 5 illustrates a smart device or a computer system or a System-on-Chip (SoC) with apparatus and/or software for analysis or correction of duty-cycle issues, in accordance with some embodiments.

FIG. 5 illustrates a smart device or a computer system or a System-on-Chip (SoC) with apparatus and/or software for analysis or correction of duty-cycle issues, in accordance with some embodiments.

In some embodiments, device 500 represents an appropriate computing device, such as a computing tablet, a mobile phone or smartphone, a laptop, a desktop, an Internet-of-Things (IOT) device, a server, a wearable device, a set-top box, a wireless-enabled e-reader, or the like. It will be understood that certain components are shown generally, and not all components of such a device are shown in device 500. The apparatus and/or software for controlling wake sources in a system to reduce power consumption in a sleep state can be in the wireless connectivity circuitries 531, PCU 510*a* or 510*b*, and/or other logic blocks (e.g., operating system 552) that can manage power for the computer system.

In an example, the device 500 comprises an SoC (System-on-Chip) 501. An example boundary of the SoC 501 is illustrated using dotted lines in FIG. 5, with some example components being illustrated to be included within SoC 501—however, SoC 501 may include any appropriate components of device 500.

In some embodiments, device 500 includes processor 504. Processor 504 can include one or more physical devices, such as microprocessors, application processors, microcontrollers, programmable logic devices, processing cores, or other processing means. The processing operations performed by processor 504 include the execution of an operating platform or operating system on which applications and/or device functions are executed. The processing operations include operations related to I/O (input/output) with a human user or with other devices, operations related to power management, operations related to connecting computing device 500 to another device, and/or the like. The processing operations may also include operations related to audio I/O and/or display I/O.

In some embodiments, processor 504 includes multiple processing cores (also referred to as cores) 508*a*, 508*b*, 508*c*. Although merely three cores 508*a*, 508*b*, 508*c* are illustrated in FIG. 5, processor 504 may include any other appropriate number of processing cores, e.g., tens, or even hundreds of processing cores. Processor cores 508*a*, 508*b*, 508*c* may be implemented on a single integrated circuit (IC) chip. Moreover, the chip may include one or more shared and/or private caches, buses or interconnections, graphics and/or memory controllers, or other components.

In some embodiments, processor 504 includes cache 506. In an example, sections of cache 506 may be dedicated to individual cores 508 (e.g., a first section of cache 506 dedicated to core 508*a*, a second section of cache 506 dedicated to core 508*b*, and so on). In an example, one or more sections of cache 506 may be shared among two or more of cores 508. Cache 506 may be split in different levels, e.g., level 1 (L1) cache, level 2 (L2) cache, level 3 (L3) cache, etc.

In some embodiments, processor core 504 may include a fetch unit to fetch instructions (including instructions with conditional branches) for execution by the core 504. The instructions may be fetched from any storage devices such as the memory 530. Processor core 504 may also include a decode unit to decode the fetched instruction. For example, the decode unit may decode the fetched instruction into a plurality of micro-operations. Processor core 504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more arithmetic logic units (ALUs). In an embodiment, a co-processor (not shown) may perform various arithmetic operations in conjunction with the execution unit.

Further, the execution unit may execute instructions out of order. Hence, processor core 504 may be an out-of-order processor core in one embodiment. Processor core 504 may also include a retirement unit. The retirement unit may retire executed instructions after they are committed. In an embodiment, retirement of the executed instructions may result in a processor state being committed from the execution of the instructions, physical registers used by the instructions being de-allocated, etc. Processor core 504 may also include a bus unit to enable communication between components of processor core 504 and other components via one or more buses. Processor core 504 may also include one or more registers to store data accessed by various components of the core 504 (such as values related to assigned app priorities and/or sub-system states (modes) association.

In some embodiments, device 500 comprises connectivity circuitries 531. For example, connectivity circuitries 531 include hardware devices (e.g., wireless and/or wired connectors and communication hardware) and/or software components (e.g., drivers, protocol stacks), e.g., to enable device 500 to communicate with external devices. Device 500 may be separate from the external devices, such as other computing devices, wireless access points or base stations, etc.

In an example, connectivity circuitries 531 may include multiple different types of connectivity. To generalize, the connectivity circuitries 531 may include cellular connectivity circuitries, wireless connectivity circuitries, etc. Cellular connectivity circuitries of connectivity circuitries 531 refer generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 531 refer to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 531 may include a network interface, such as a wired or wireless interface, e.g., so that a system embodiment may be incorporated into a wireless device, for example, a cell phone or personal digital assistant.

In some embodiments, device 500 comprises control hub 532, which represents hardware devices and/or software components related to interaction with one or more I/O devices. For example, processor 504 may communicate with one or more of display 522, one or more peripheral devices 524, storage devices 528, one or more other external devices 529, etc., via control hub 532. Control hub 532 may be a chipset, a platform controller hub (PCH), and/or the like.

For example, control hub 532 illustrates one or more connection points for additional devices that connect to device 500, e.g., through which a user might interact with the system. For example, devices (e.g., devices 529) that can be attached to device 500 include microphone devices, speaker or stereo systems, audio devices, video systems or other display devices, keyboard or keypad devices, or other I/O devices for use with specific applications such as card readers or other devices.

As mentioned above, control hub 532 can interact with audio devices, display 522, etc. For example, input through a microphone or other audio device can provide input or commands for one or more applications or functions of device 500. Additionally, audio output can be provided instead of, or in addition to, display output. In another example, if display 522 includes a touch screen, display 522 also acts as an input device, which can be at least partially managed by control hub 532. There can also be additional buttons or switches on computing device 500 to provide I/O functions managed by control hub 532. In one embodiment, control hub 532 manages devices such as accelerometers, cameras, light sensors or other environmental sensors, or other hardware that can be included in device 500. The input can be part of direct user interaction, as well as providing environmental input to the system to influence its operations (such as filtering for noise, adjusting displays for brightness detection, applying a flash for a camera, or other features).

In some embodiments, control hub 532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 522 represents hardware (e.g., display devices) and software (e.g., drivers) components that provide a visual and/or tactile display for a user to interact with device 500. Display 522 may include a display interface, a display screen, and/or hardware device used to provide a display to a user. In some embodiments, display 522 includes a touch screen (or touch pad) device that provides both output and input to a user. In an example, display 522 may communicate directly with the processor 504. Display 522 can be one or more of an internal display device, as in a mobile electronic device or a laptop device or an external display device attached via a display interface (e.g., DisplayPort, etc.). In one embodiment, display 522 can be a head mounted display (HMD) such as a stereoscopic display device for use in virtual reality (VR) applications or augmented reality (AR) applications.

In some embodiments, and although not illustrated in the figure, in addition to (or instead of) processor 504, device 500 may include Graphics Processing Unit (GPU) comprising one or more graphics processing cores, which may control one or more aspects of displaying contents on display 522.

Control hub 532 (or PCH) may include hardware interfaces and connectors, as well as software components (e.g., drivers, protocol stacks) to make peripheral connections, e.g., to peripheral devices 524.

It will be understood that device 500 could both be a peripheral device to other computing devices, as well as have peripheral devices connected to it. Device 500 may have a "docking" connector to connect to other computing devices for purposes such as managing (e.g., downloading and/or uploading, changing, synchronizing) content on device 500. Additionally, a docking connector can allow device 500 to connect to certain peripherals that allow computing device 500 to control content output, for example, to audiovisual or other systems.

In addition to a proprietary docking connector or other proprietary connection hardware, device 500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 531 may be coupled to control hub 532, e.g., in addition to, or instead of, being coupled directly to the processor 504. In some embodiments, display 522 may be coupled to control hub 532, e.g., in addition to, or instead of, being coupled directly to processor 504.

In some embodiments, device 500 comprises memory 530 coupled to processor 504 via memory interface 534. Memory 530 includes memory devices for storing information in device 500.

In some embodiments, memory 530 includes an apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 530 can be a dynamic random-access memory (DRAM) device, a static random-access memory (SRAM) device, flash memory device, phase-change memory device, or some other memory device having suitable performance to serve as process memory. In one embodiment, memory 530 can operate as system memory for device 500, to store data and instructions for use when the one or more processors 504 executes an application or process. Memory 530 can store application data, user data, music, photos, documents, or other data, as well as system data (whether long-term or temporary) related to the execution of the applications and functions of device 500.

Elements of various embodiments and examples are also provided as a machine-readable medium (e.g., memory 530) for storing the computer-executable instructions (e.g., instructions to implement any other processes discussed herein). The machine-readable medium (e.g., memory 530) may include, but is not limited to, flash memory, optical disks, CD-ROMs, DVD ROMs, RAMS, EPROMS, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 500 comprises temperature measurement circuitries 540, e.g., for measuring temperature of various components of device 500. In an example, temperature measurement circuitries 540 may be embedded in or coupled or attached to various components, whose temperature are to be measured and monitored. For example, temperature measurement circuitries 540 may measure temperature of (or within) one or more of cores 508a, 508b, 508c, voltage regulator 514, memory 530, a mother-board of SoC 501, and/or any appropriate component of device 500.

In some embodiments, device 500 comprises power measurement circuitries 542, e.g., for measuring power consumed by one or more components of the device 500. In an example, in addition to, or instead of, measuring power, the power measurement circuitries 542 may measure voltage and/or current. In an example, the power measurement circuitries 542 may be embedded in or coupled or attached to various components, whose power, voltage, and/or current consumption are to be measured and monitored. For example, power measurement circuitries 542 may measure power, current and/or voltage supplied by one or more voltage regulators 514, power supplied to SoC 501, power supplied to device 500, power consumed by processor 504 (or any other component) of device 500, etc.

In some embodiments, device 500 comprises one or more voltage regulator circuitries, generally referred to as voltage regulator (VR) 514. VR 514 generates signals at appropriate voltage levels, which may be supplied to operate any appropriate components of the device 500. Merely as an example, VR 514 is illustrated to be supplying signals to processor 504 of device 500. In some embodiments, VR 514 receives one or more Voltage Identification (VID) signals, and generates the voltage signal at an appropriate level, based on the VID signals. Various type of VRs may be utilized for the VR 514. For example, VR 514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 510*a*/*b* and/or PMIC 512. In some embodiments, each core has a network of distributed LDOs to provide efficient control for power management. The LDOs can be digital, analog, or a combination of digital or analog LDOs. In some embodiments, VR 514 includes a current tracking apparatus to measure current through power supply rail(s).

In some embodiments, device 500 comprises one or more clock generator circuitries, generally referred to as clock generator 516. Clock generator 516 generates clock signals at appropriate frequency levels, which may be supplied to any appropriate components of device 500. Merely as an example, clock generator 516 is illustrated to be supplying clock signals to processor 504 of device 500. In some embodiments, clock generator 516 receives one or more Frequency Identification (FID) signals, and generates the clock signals at an appropriate frequency, based on the FID signals.

In some embodiments, device 500 comprises battery 518 supplying power to various components of device 500. Merely as an example, battery 518 is illustrated to be supplying power to processor 504. Although not illustrated in the figures, device 500 may comprise a charging circuitry, e.g., to recharge the battery, based on Alternating Current (AC) power supply received from an AC adapter.

In some embodiments, device 500 comprises Power Control Unit (PCU) 510 (also referred to as Power Management Unit (PMU), Power Controller, etc.). In an example, some sections of PCU 510 may be implemented by one or more processing cores 508, and these sections of PCU 510 are symbolically illustrated using a dotted box and labelled PCU 510*a*. In an example, some other sections of PCU 510 may be implemented outside the processing cores 508, and these sections of PCU 510 are symbolically illustrated using a dotted box and labelled as PCU 510*b*. PCU 510 may implement various power management operations for device 500. PCU 510 may include hardware interfaces, hardware circuitries, connectors, registers, etc., as well as software components (e.g., drivers, protocol stacks), to implement various power management operations for device 500.

In some embodiments, device 500 comprises Power Management Integrated Circuit (PMIC) 512, e.g., to implement various power management operations for device 500. In some embodiments, PMIC 512 is a Reconfigurable Power Management IC (RPMIC) and/or an IMVP (Intel® Mobile Voltage Positioning). In an example, the PMIC is within an IC chip separate from processor 504. The PMIC 512 may implement various power management operations for device 500. PMIC 512 may include hardware interfaces, hardware circuitries, connectors, registers, etc., as well as software components (e.g., drivers, protocol stacks), to implement various power management operations for device 500.

In an example, device 500 comprises one or both PCU 510 or PMIC 512. In an example, any one of PCU 510 or PMIC 512 may be absent in device 500, and hence, these components are illustrated using dotted lines.

Various power management operations of device 500 may be performed by PCU 510, by PMIC 512, or by a combination of PCU 510 and PMIC 512. For example, PCU 510 and/or PMIC 512 may select a power state (e.g., P-state) for various components of device 500. For example, PCU 510 and/or PMIC 512 may select a power state (e.g., in accordance with the ACPI (Advanced Configuration and Power Interface) specification) for various components of device 500. Merely as an example, PCU 510 and/or PMIC 512 may cause various components of the device 500 to transition to a sleep state, to an active state, to an appropriate C state (e.g., C0 state, or another appropriate C state, in accordance with the ACPI specification), etc. In an example, PCU 510 and/or PMIC 512 may control a voltage output by VR 514 and/or a frequency of a clock signal output by the clock generator, e.g., by outputting the VID signal and/or the FID signal, respectively. In an example, PCU 510 and/or PMIC 512 may control battery power usage, charging of battery 518, and features related to power saving operation.

The clock generator 516 can comprise a phase locked loop (PLL), frequency locked loop (FLL), or any suitable clock source. In some embodiments, each core of processor 504 has its own clock source. As such, each core can operate at a frequency independent of the frequency of operation of the other core. In some embodiments, PCU 510 and/or PMIC 512 performs adaptive or dynamic frequency scaling or adjustment. For example, clock frequency of a processor core can be increased if the core is not operating at its maximum power consumption threshold or limit. In some embodiments, PCU 510 and/or PMIC 512 determines the operating condition of each core of a processor, and opportunistically adjusts frequency and/or power supply voltage of that core without the core clocking source (e.g., PLL of that core) losing lock when the PCU 510 and/or PMIC 512 determines that the core is operating below a target performance level. For example, if a core is drawing current from a power supply rail less than a total current allocated for that core or processor 504, then PCU 510 and/or PMIC 512 can temporarily increase the power draw for that core or processor 504 (e.g., by increasing clock frequency and/or power supply voltage level) so that the core or processor 504 can perform at higher performance level. As such, voltage and/or frequency can be increased temporarily for processor 504 without violating product reliability.

In an example, PCU 510 and/or PMIC 512 may perform power management operations, e.g., based at least in part on receiving measurements from power measurement circuitries 542, temperature measurement circuitries 540, charge level of battery 518, and/or any other appropriate information that may be used for power management. To that end, PMIC 512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 510 and/or PMIC 512 in at least one embodiment to allow PCU 510 and/or PMIC 512 to manage processor core energy at least in part based on value(s) detected by one or more of the sensors.

Also illustrated is an example software stack of device 500 (although not all elements of the software stack are illustrated). Merely as an example, processors 504 may execute application programs 550, operating system 552, one or more Power Management (PM) specific application programs (e.g., generically referred to as PM applications 558), and/or the like. PM applications 558 may also be executed by the PCU 510 and/or PMIC 512. OS 552 may also include one or more PM applications 556a, 556b, 556c. The OS 552 may also include various drivers 554a, 554b, 554c, etc., some of which may be specific for power management purposes. In some embodiments, device 500 may further comprise a Basic Input/Output System (BIOS) 520. BIOS 520 may communicate with OS 552 (e.g., via one or more drivers 554), communicate with processors 504, etc.

For example, one or more of PM applications 558, 556, drivers 554, BIOS 520, etc. may be used to implement power management specific tasks, e.g., to control voltage and/or frequency of various components of device 500, to control wake-up state, sleep state, and/or any other appropriate power state of various components of device 500, control battery power usage, charging of the battery 518, features related to power saving operation, etc.

In some embodiments, battery 518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to the battery, which is used to enable high-energy density battery with, for example, 20% more battery life.

In some embodiments, pCode executing on PCU 510a/b has a capability to enable extra compute and telemetries resources for the runtime support of the pCode. Here pCode refers to a firmware executed by PCU 510a/b to manage performance of the SoC 501. For example, pCode may set frequencies and appropriate voltages for the processor. Part of the pCode is accessible via OS 552. In various embodiments, mechanisms and methods are provided that dynamically change an Energy Performance Preference (EPP) value based on workloads, user behavior, and/or system conditions. There may be a well-defined interface between OS 552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 552 by including machine-learning support as part of OS 552 and either tuning the EPP value that the OS hints to the hardware (e.g., various components of SoC 501) by machine-learning prediction, or by delivering the machine-learning prediction to the pCode in a manner similar to that done by a Dynamic Tuning Technology (DTT) driver. In this model, OS 552 may have visibility to the same set of telemetries as are available to a DTT. As a result of a DTT machine-learning hint setting, pCode may tune its internal algorithms to achieve optimal power and performance results following the machine-learning prediction of activation type. The pCode, as an example, may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 552 and the other from software such as DTT, and may selectively choose to provide higher performance and/or responsiveness. As part of this method, the pCode may enable in the DTT an option to tune its reaction for the DTT for different types of activity.

Some non-limiting Examples of various embodiments are presented below.

Example 1 includes an apparatus comprising: a first circuit with a plurality of stages; and a second circuit communicatively coupled with the first circuit, wherein the second circuit includes: a plurality of tap lines, wherein respective tap lines of the plurality of tap lines are coupled between two stages of the plurality of stages; and logic, wherein the logic is to identify, based on an average voltage measurement of at least one tap line, a status of a duty-cycle of a signal propagating through a stage of the first circuit.

Example 2 includes the apparatus of example 1, or some other example herein, wherein the first circuit is a high-speed serial input/output (I/O) circuit.

Example 3 includes the apparatus of example 1, or some other example herein, wherein respective ones of the plurality of tap lines includes a resistor.

Example 4 includes the apparatus of any of examples 1-3, or some other example herein, wherein the logic is to identify the status of the duty-cycle based on a comparison of the average voltage measurement to a threshold value.

Example 5 includes the apparatus of example 4, or some other example herein, wherein the threshold value is a value between signal-level and off-level of the first circuit.

Example 6 includes the apparatus of example 4, or some other example herein, wherein the logic is further to determine, based on an identification that a value of the average voltage measurement is above the threshold value, that the duty-cycle is biased toward signal-level.

Example 7 includes the apparatus of example 4, or some other example herein, wherein the logic is further to determine, based on an identification that a value of the average voltage measurement is below the threshold value, that the duty-cycle is biased toward off-level.

Example 8 includes the apparatus of any of examples 1-3, or some other example herein, wherein the logic is further to identify, based on an identification of which tap line of the plurality of tap lines provided a signal related to the voltage measurement, which stage of the plurality of stages the voltage measurement is related to.

Example 9 includes the apparatus of any of examples 1-3, or some other example herein, wherein the logic is further to alter, based on the status of the identified duty-cycle, a future iteration of the duty-cycle.

Example 10 includes the apparatus of example 9, or some other example herein, wherein the alteration is an alteration of at least one of voltage, current, or phase of a signal supplied to the first circuit.

Example 11 includes a circuit comprising: a plurality of tap lines, wherein respective tap lines of the plurality of tap lines are coupled between two stages of a plurality of stages of a first circuit; and logic, wherein the logic is to identify, based on an average voltage measurement of at least one tap line, a status of a duty-cycle of a signal propagating through a stage of the first circuit.

Example 12 includes the circuit of example 11, or some other example herein, wherein the first circuit is a high-speed serial input/output (I/O) circuit.

Example 13 includes the circuit of example 11, or some other example herein, wherein respective ones of the plurality of tap lines includes a resistor.

Example 14 includes the circuit of any of examples 11-13, or some other example herein, wherein the logic is to identify the status of the duty-cycle based on a comparison of the average voltage measurement to a threshold value.

Example 15 includes the circuit of example 14, or some other example herein, wherein the threshold value is a value between signal-level and off-level of the first circuit.

Example 16 includes the circuit of example 14, or some other example herein, wherein the logic is further to determine, based on an identification that a value of the average voltage measurement is above the threshold value, that the duty-cycle is biased toward signal-level.

Example 17 includes the circuit of example 14, or some other example herein, wherein the logic is further to determine, based on an identification that a value of the average voltage measurement is below the threshold value, that the duty-cycle is biased toward off-level.

Example 18 includes the circuit of any of examples 11-13, or some other example herein, wherein the logic is further to identify, based on an identification of which tap line of the plurality of tap lines provided a signal related to the voltage measurement, which stage of the plurality of stages the voltage measurement is related to.

Example 19 includes the circuit of any of examples 11-13, or some other example herein, wherein the logic is further to alter, based on the status of the identified duty-cycle, a future iteration of the duty-cycle.

Example 20 includes the circuit of example 19, or some other example herein, wherein the alteration is an alteration of at least one of voltage, current, or phase of a signal supplied to the first circuit.

Example 21 includes one or more non-transitory computer-readable media comprising instructions that, upon execution of the instructions by a logic, are to cause the logic to: identify, based on a signal received from at least one tap line of a plurality of tap lines that are respectively coupled between stages of a plurality of stages of a first circuit, an average voltage measurement of the first circuit at a point at which the at least one tap line is coupled to the first circuit; compare the average voltage measurement to a voltage threshold; and identify, based on the comparison, a status of a duty-cycle of the first circuit.

Example 22 includes the one or more non-transitory computer-readable media of example 21, or some other example herein, wherein the first circuit is a high-speed serial input/output (I/O) circuit.

Example 23 includes the one or more non-transitory computer-readable media of example 21, or some other example herein, wherein respective ones of the plurality of tap lines includes a resistor.

Example 24 includes the one or more non-transitory computer-readable media of any of examples 21-23, or some other example herein, wherein the instructions are further to cause the logic to identify the status of the duty-cycle based on a comparison of the average voltage measurement to a threshold value.

Example 25 includes the one or more non-transitory computer-readable media of example 24, or some other example herein, wherein the threshold value is a value between signal-level and off-level of the first circuit.

Example 26 includes the one or more non-transitory computer-readable media of example 24, or some other example herein, wherein the instructions are further to cause the logic to determine, based on an identification that a value of the average voltage measurement is above the threshold value, that the duty-cycle is biased toward signal-level.

Example 27 includes the one or more non-transitory computer-readable media of example 24, or some other example herein, wherein the instructions are further to cause the logic to determine, based on an identification that a value of the average voltage measurement is below the threshold value, that the duty-cycle is biased toward off-level.

Example 28 includes the one or more non-transitory computer-readable media of any of examples 21-23, or some other example herein, wherein the instructions are further to cause the logic to identify, based on an identification of which tap line of the plurality of tap lines provided a signal related to the voltage measurement, which stage of the plurality of stages the voltage measurement is related to.

Example 29 includes the one or more non-transitory computer-readable media of any of examples 21-23, or some other example herein, wherein the instructions are further to cause the logic to alter, based on the status of the identified duty-cycle, a future iteration of the duty-cycle.

Example 30 includes the one or more non-transitory computer-readable media of example 29, or some other example herein, wherein the alteration is an alteration of at least one of voltage, current, or phase of a signal supplied to the first circuit.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications, and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

The invention claimed is:

1. An apparatus comprising:
a first circuit that is a high-speed serial input/output (I/O) with a plurality of stages having a signal of greater than 8 GHz propagating through at least one of the plurality of stages; and
a second circuit communicatively coupled with the first circuit, wherein the second circuit includes:
a plurality of tap lines, wherein respective tap lines of the plurality of tap lines are coupled between two stages of the plurality of stages; and
logic, wherein the logic is to identify, based on an average voltage measurement of at least one tap line, a status of a duty-cycle of the signal propagating through the first circuit.

2. The apparatus of claim 1, wherein respective ones of the plurality of tap lines includes a resistor.

3. The apparatus of claim 1, wherein the logic is to identify the status of the duty-cycle based on a comparison of the average voltage measurement to a threshold value.

4. The apparatus of claim 1, wherein the logic is further to identify, based on an identification of which tap line of the plurality of tap lines provided a signal related to the voltage measurement, which stage of the plurality of stages the voltage measurement is related to.

5. The apparatus of claim 1, wherein the logic is further to alter, based on the status of the identified duty-cycle, a future iteration of the duty-cycle.

6. A circuit comprising:
a plurality of tap lines, wherein respective tap lines of the plurality of tap lines are coupled between two stages of a plurality of stages of a first circuit that is a high-speed serial input/output (I/O) circuit with a plurality of stages having a signal of greater than 8 GHz propagating through at least one of the plurality of stages; and
logic, wherein the logic is to identify, based on an average voltage measurement of at least one tap line, a status of a duty-cycle of a signal propagating through a stage of the first circuit.

7. The circuit of claim 6, wherein the logic is to identify the status of the duty-cycle based on a comparison of the average voltage measurement to a threshold value.

8. The circuit of claim 7, wherein the threshold value is a value between signal-level and off-level of the first circuit.

9. The circuit of claim 7, wherein the logic is further to determine, based on an identification that a value of the average voltage measurement is above the threshold value, that the duty-cycle is biased toward signal-level.

10. The circuit of claim 7, wherein the logic is further to determine, based on an identification that a value of the average voltage measurement is below the threshold value, that the duty-cycle is biased toward off-level.

11. The circuit of claim 6, wherein the logic is further to identify, based on an identification of which tap line of the plurality of tap lines provided a signal related to the voltage measurement, which stage of the plurality of stages the voltage measurement is related to.

12. The circuit of claim 6, wherein the logic is further to alter, based on the status of the identified duty-cycle, a future iteration of the duty-cycle.

13. The circuit of claim 12, wherein the alteration is an alteration of at least one of voltage, current, or phase of a signal supplied to the first circuit.

14. One or more non-transitory computer-readable media comprising instructions that, upon execution of the instructions by a logic, are to cause the logic to:
identify, based on a signal received from at least one tap line of a plurality of tap lines that are respectively coupled between stages of a plurality of stages of a first circuit that is a high-speed serial input/output (I/O) circuit with a plurality of stages having a signal of greater than 8 GHz propagating through at least one of the plurality of stages, an average voltage measurement of the first circuit at a point at which the at least one tap line is coupled to the first circuit;
compare the average voltage measurement to a voltage threshold; and
identify, based on the comparison, a status of a duty-cycle of the first circuit.

15. The one or more non-transitory computer-readable media of claim 14, wherein respective ones of the plurality of tap lines includes a resistor.

16. The one or more non-transitory computer-readable media of claim 14, wherein the instructions are further to cause the logic to identify the status of the duty-cycle based on a comparison of the average voltage measurement to a threshold value.

17. The one or more non-transitory computer-readable media of claim 16, wherein the threshold value is a value between signal-level and off-level of the first circuit.

18. The one or more non-transitory computer-readable media of claim 16, wherein the instructions are further to cause the logic to determine, based on an identification that a value of the average voltage measurement is above the threshold value, that the duty-cycle is biased toward signal-level.

19. The one or more non-transitory computer-readable media of claim 16, wherein the instructions are further to cause the logic to determine, based on an identification that a value of the average voltage measurement is below the threshold value, that the duty-cycle is biased toward off-level.

* * * * *